United States Patent Office 2,788,707
Patented Apr. 16, 1957

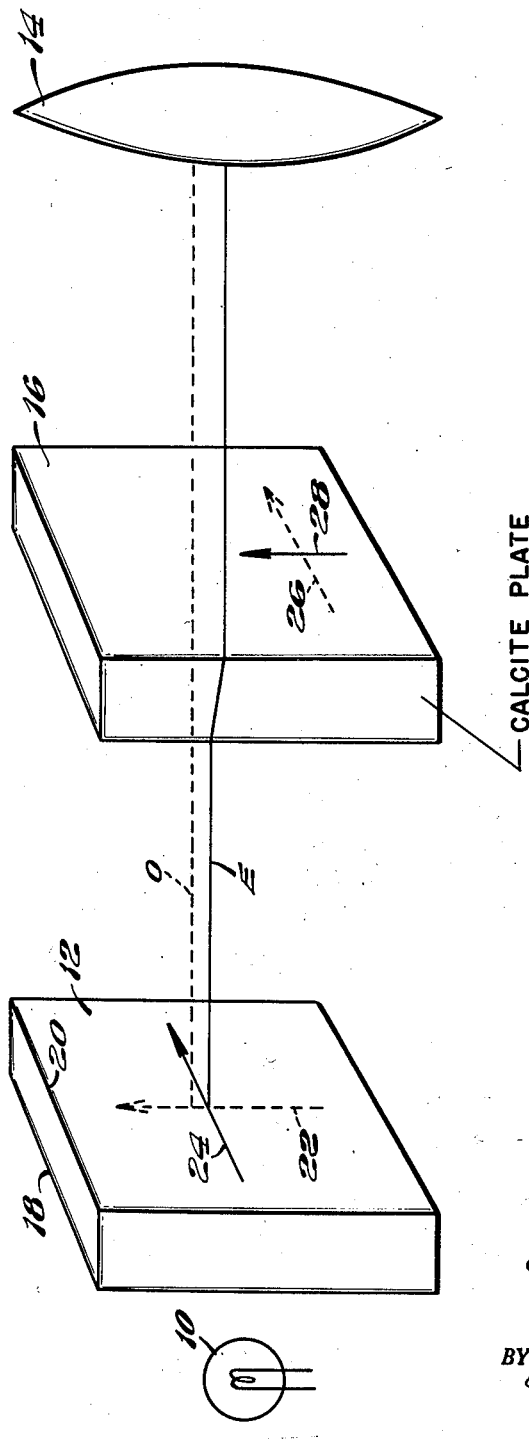

2,788,707

PROJECTION SYSTEM FOR STEREOSCOPIC IMAGES

Edwin H. Land, Cambridge, Mass., assignor to Polaroid Corporation, Cambridge, Mass., a corporation of Delaware Application February 19, 1954, Serial No. 411,318

7 Claims. (Cl. 88—24)

The present invention relates generally to the projection of stereoscopic images and, as illustrated herein, relates more particularly to the projection of stereoscopic images formed on opposite faces of a transparent slide or support.

The projection of two-dimensional motion pictures or three-dimensional motion pictures involves the use of lens systems of relatively short focal length and high aperture. A high aperture, or opening, is necessary to provide sufficient screen illumination. Such lens systems, however, are not entirely satisfactory when stereoscopic motion picture film, having a polarized stereoscopic image on one side of the film and another polarized stereoscopic image on the other side of the film, is projected. The two projected images may differ in sharpness since the short focal length of the lens system, the necessarily high aperture and the high magnification of the images result in an extremely limited depth of field. The thickness of the usual motion picture film is approximately .005 of an inch, which is somewhat greater than the depth of field of the projector lens system under the conditions necessary for satisfactory motion picture projection.

One object of the present invention, accordingly, is to provide means for use in conventional motion picture projectors which will insure that the two images located on opposite faces of a transparent support will be projected onto a screen with substantially equal sharpness.

Another object of the invention is to provide a projection system which will project stereoscopic images located on opposite surfaces of a transparent support with substantially equal sharpness. To this end, there is incorporated in the projection system a doubly refracting element which is effective to retard the light of which one image on one surface is composed to a greater extent than the other image on the other surface. As illustrated, the thickness of the doubly refracting element is sufficient to make the light paths of the two images from the film or support to the lens system of substantially the same length.

Another object of the invention is to improve generally both the construction and operation of stereoscopic projectors.

Other objects of the invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claims.

For a fuller understanding of the nature and objects of the invention, reference should be had to the following detailed description taken in connection with the accompanying drawing figure which comprises a diagrammatic view illustrating a preferred form of apparatus embodying the present invention.

The present invention is illustrated herein as embodied in a projection system of usual construction including a source of light 10, means for supporting and advancing a stereoscopic film 12, a lens system 14, and a birefringent wave-retarding plate 16. The lens system 14 preferably comprises a plurality of lenses forming a system having a short focal length of the order of five inches and a high aperture of the order of f/2.5. Although the wave-retarding plate 16 is shown as being located in the space between the lens system 14 and film 12 it could, if so desired, be incorporated in the lens system.

The plate or sheet 16 may be made of any doubly refracting or birefringent material of suitable thickness. As illustrated, the sheet or plate 16 is preferably formed of calcite but it is evident that a sheet of other suitable doubly refracting or birefringent material could be substituted therefor.

The film 12 comprises a generally transparent or translucent sheet or support having light-polarizing surfaces 18 and 20. These surfaces may comprise light-polarizing material such, for example, as a suspension of minute, needle-shaped, polarizing particles suspended in a light-transmitting medium, or they may comprise any other means for providing a light-polarizing surface. Surface 18 is provided with one image of a stereoscopic pair and the other surface 20 is provided with the other or right-eye image of the stereoscopic pair. These images may take any form and may comprise a full-tone reproduction, a half-tone reproduction, a line drawing, a stereographic image, or any other type of image or design. The images may be formed as described and claimed in United States Letters Patent No. 2,203,687, granted June 11, 1940, on an application filed in the names of Edwin H. Land and Joseph Mahler.

For the purpose of illustration, the light-polarizing surface 18 is shown herein as having its polarizing axis vertical or, in the direction shown, by the arrow 22. The image formed on this surface may be formed in any of a number of ways as set forth, for example, in the above-mentioned Letters Patent. The surface 18 may have been treated to destroy all or a portion of the polarizing properties therein to form the desired left-eye stereoscopic image. The surface 20 is shown herein as having its polarizing axis at right angles to the polarizing axis of the surface 18 or horizontal as indicated by the arrow 24. The surface 20 is treated to provide a right-eye stereoscopic image in a manner similar to the manner in which the left-eye image is formed. The images are thus superimposed on the support 12 and when viewed through suitable analyzers, the left-eye image becomes clearly visible to the left eye and the right-eye image becomes clearly visible to the right eye of the observer.

The support 12, which may be motion picture film, is of substantial thickness and is approximately .005 inch in thickness. The lens system used in the projection of motion pictures is of relatively short focal length of the order of five inches and is used at extremely wide aperture, as great as f/2.5, in order to provide sufficient screen illumination. A lens system under the conditions described just above has a very limited depth of field which oftentimes is substantially less than the thickness of the film or support 12. Hence, it is not possible when using stereoscopic film such as described above to obtain maximum sharpness of both projected images.

The present invention, as illustrated, contemplates the use of a doubly refracting sheet interposed in the projection system to retard the light from one of said surfaces sufficiently to make the light paths from both of said images substantially equal. To this end, the calcite sheet 16 is positioned so that the polarization axis of the ordinary ray is parallel to the polarization axis of the surface 18 and the polarization axis of the extraordinary ray is at right angles thereto or parallel to the polarization axis of the surface 20. Since the direction of propagation of light is always the same and the thickness of the film is substantially constant, the extent of retardation is a function of the thickness of the sheet of calcite. Thus, the thickness of the calcite plate necessary to provide substantially equal light paths may be readily determined.

Thickness of birefringent sheet =

$$\left\{ \frac{[n_{\text{ordinary}}] \times [n_{\text{extraordinary}}]}{n_{\text{ordinary}} - n_{\text{extraordinary}}} \right\} \times \left\{ \frac{\text{Thickness of film}}{n_{\text{Film}}} \right\}$$

To state this expression in words, the thickness of a birefringent sheet necessary to provide the proper retardation is equal to the product of the indices of refraction of the ordinary and extraordinary rays at the D line divided by the difference between said indices, multiplied by the thickness of the image-carrying film or support and divided by the index of refraction of the film or support taken at the D line. The values of thickness of the film and the birefringent sheet are herein expressed in inches. Thus, the thickness of a calcite sheet, for example, required to provide the necessary retardation wherein the index of refraction of the ordinary and the extraordinary rays at the D line are 1.65836 and 1.48639, respectively, and the thickness of the film or support is .005 inch and the index of refraction of the film at the D line is 1.5, is .0478 inch.

Although the present invention is illustrated with particular reference to the use of a birefringent plate or sheet, it is to be understood that it is not limited thereto but contemplates also the use of a birefringent lens of proper curvature. The birefringent lens is preferably, although not necessarily, plano-convex, since this form is more convenient. The birefringent lens is preferably formed of calcite and is located in front of the projection lens. The birefringent lens would preferably be cemented to a glass lens having a power approximately equal and opposite to the power of the birefringent lens.

A birefringent lens having one side plane and designed to compensate the focus in a system for projecting stereoscopic images formed on opposite faces of a transparent support or slide may be provided with a curvature formed according to the formula:

$$R = \frac{nf^2 \Delta n}{t}$$

where R equals radius of curvature on birefringent lens (other side of lens to be plano); $n$ equals refractive index of film base; $t$ equals thickness of film base; $n$ equals difference in refractive indices of the birefringent material; and $f$ equals focal length of projection lens.

The birefringent lens disclosed above must be properly oriented with respect to the axes of polarization of the stereoscopic images on opposite surfaces of the film or support 12. The birefringent lens is so oriented that the polarization axis of the ordinary ray is parallel to the polarization axis of the surface 18 on the support 12 and the polarization axis of the extraordinary ray is at right angles thereto or parallel to the polarization axis of the surface 20 on the support 12.

It is apparent that the system described herein is applicable equally to the projection of black-and-white, dichroic, stereoscopic images and to colored dichroic stereoscopic images, where the images are superimposed on opposite faces of the support, and it will be apparent also that, in every case where this specification has referred to motion picture film or projectors, the devices described are equally adapted for use in the projection of still pictures. Furthermore, the system described herein may also be used in connection with non-stereoscopic colored, dichroic images superimposed on a film or other substantially transparent support.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A projection system for simultaneously projecting matched images disposed on opposite faces of a substantially transparent support, each of said faces being adapted to polarize light transmitted thereby, the polarizing axis of said surfaces being positioned substantially at right angles to each other, said system having, in combination, a lens system including a light-transmitting member formed of birefringent material arranged in optical alignment therewith to retard light of which the front image is composed to a greater extent than the light of which the rear image is composed to provide substantially equal optical lengths of light paths from said images to said lens system.

2. A projection system for projecting a pair of superposed matched images disposed on opposite faces of a transparent support, each of said faces being adapted to polarize light transmitted thereby, the polarizing axes of said faces being positioned substantially at right angles to each other, said system having, in combination, a short focal length lens system and a retardation plate in optical alignment therewith and having its optical axes arranged in substantial parallelism with the polarization axes of said superposed matched images, said retardation plate being arranged to retard light polarized by the image on the face of the support nearest the lens system to a greater extent than the polarized light of which the other image is composed, thus providing substantially equal optical lengths of light paths from said images to said lens system.

3. A projection system for simultaneously projecting a pair of superposed stereoscopic images disposed on opposite faces of a transparent support, each of said faces being adapted to polarize light transmitted thereby, the polarizing axes of said faces being positioned substantially at right angles to each other, said system having, in combination, a lens system and a doubly refracting element interposed between said lens system and said support arranged to retard light of which the front image is composed to a greater extent than the light of which the rear image is composed to provide substantially equal optical lengths of light paths from said images to said lens system.

4. A projection system for simultaneously projecting a pair of superposed stereoscopic images disposed on opposite faces of a transparent support, each of said faces being adapted to polarize light transmitted thereby, the polarizing axes of said faces being positioned substantially at right angles to each other, said system having, in combination, a short focal length lens system and a doubly refracting element having its optical axes arranged in substantial parallelism with the polarization axes of said stereoscopic images, said element being arranged to retard light of which the front image is composed to a greater extent than the light of which the rear image is composed to provide substantially equal optical lengths of light paths from said images to said lens system.

5. A projection system for simultaneously projecting a pair of superposed stereoscopic images disposed on opposite faces of a transparent support, each of said faces being adapted to polarize light transmitted thereby, the polarizing axes of said faces being positioned substantially at right angles to each other, said system having, in combination, a short focal length lens system, having a depth of field substantially less than the thickness of said support, and a doubly refracting element having its optical axes arranged in substantial parallelism with the polarization axes of said stereoscopic images, said element being arranged to retard light of which the front image is composed to a greater extent than the light of which the rear image is composed to provide substantially equal optical lengths of light paths from said images to said lens system.

6. A projection system for simultaneously projecting a pair of superposed stereoscopic images disposed on opposite faces of a transparent support, each of said faces being adapted to polarize light transmitted thereby, the polarizing axes of said faces being positioned substantially at right angles to each other, said system having, in combination, a short focal length lens system, having a depth of field substantially less than the thickness of said support, and a doubly refracting element having its optical axes arranged in substantial parallelism with the polarization axes of said stereoscopic images, said elment having a thickness of the order expressed by the formula:

Thickness of birefringent sheet =

$$\left\{\frac{[n_{\text{ordinary}}] \times [n_{\text{extraordinary}}]}{n_{\text{ordinary}} - n_{\text{extraordinary}}}\right\} \times \left\{\frac{\text{Thickness of film}}{n_{\text{Film}}}\right\}$$

wherein $n_{\text{ordinary}}$ and $n_{\text{extraordinary}}$ represent the refraction of the ordinary and extraordinary rays of a doubly refracting material at the D line, and $n_{\text{Film}}$ represents the index of refraction of the image-carrying film or support taken at the D line, said thickness of said doubly refracting element being sufficient to provide substantially equal optical lengths of light paths from each of said images to said lens system, thereby insuring that the images will be projected with substantially the same sharpness.

7. A projection system for simultaneously projecting superposed stereoscopic images disposed on opposite faces of a transparent support, each of said faces being adapted to polarize light transmitted thereby, the polarizing axes of said faces being positioned substantially at right angles to each other, said system having, in combination, a short focal length lens system including a light-transmitting birefringent plano-convex lens, said birefringent plano-convex lens having a radius of curvature of the order expressed by the formula:

$$R = \frac{nf^2 \Delta n}{t}$$

where R equals radius of curvature on birefringent lens; $n$ equals refractive index of film base; $t$ equals thickness of film base or support; $\Delta n$ equals the difference between the refractive indices of the birefringent material at the D-line; and $f$ equals focal length of the projection lens.

References Cited in the file of this patent

UNITED STATES PATENTS

| | | |
|---|---|---|
| 2,203,687 | Land et al. | June 11, 1940 |
| 2,241,041 | Sauer | May 6, 1941 |
| 2,249,061 | Styll | July 15, 1941 |
| 2,262,524 | Ball | Nov. 11, 1941 |
| 2,269,713 | Erwin | Jan. 13, 1942 |
| 2,280,297 | Neumueller et al. | Apr. 21, 1942 |
| 2,297,443 | Von Ardenne | Sept. 29, 1942 |
| 2,317,875 | Athey et al. | Apr. 27, 1943 |
| 2,674,156 | Mahler | Apr. 6, 1954 |